UNITED STATES PATENT OFFICE.

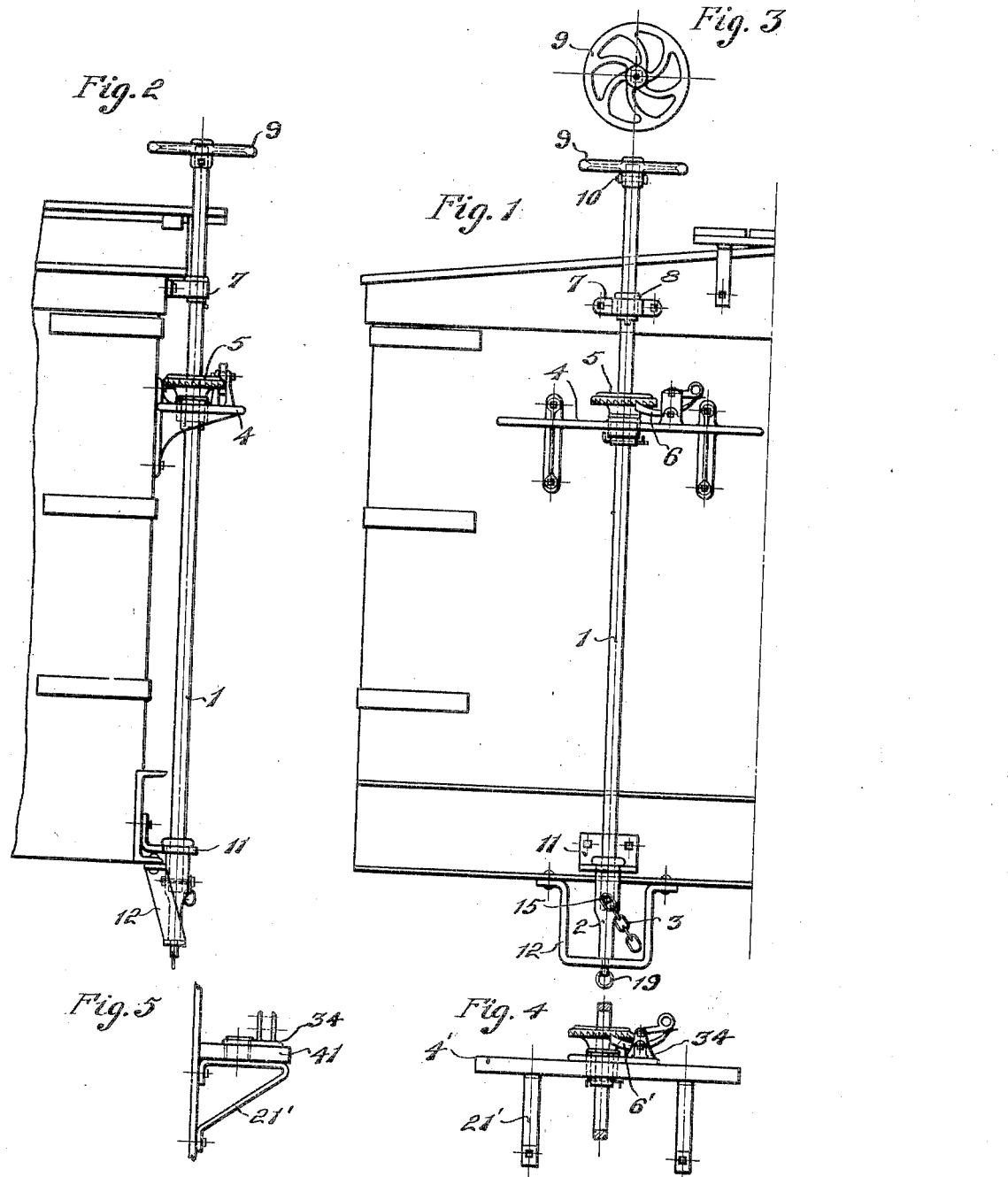

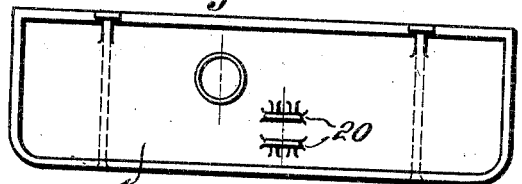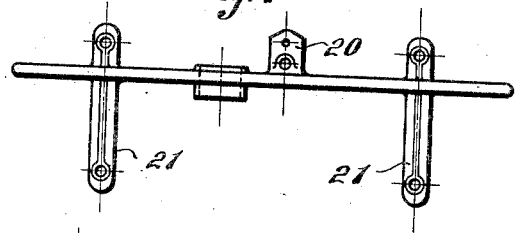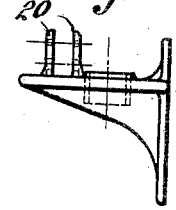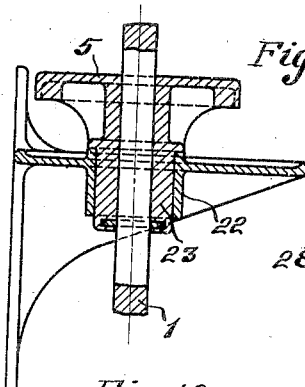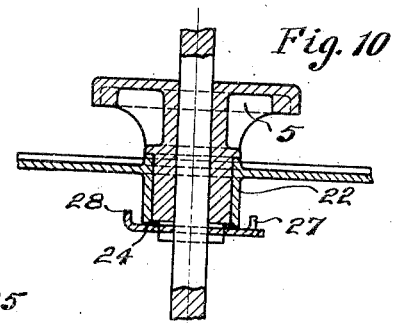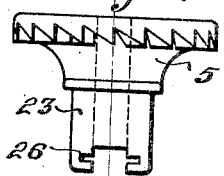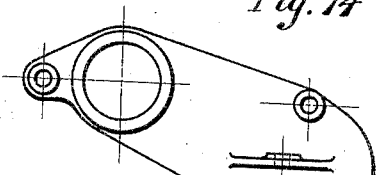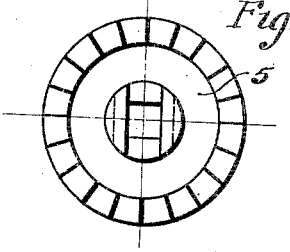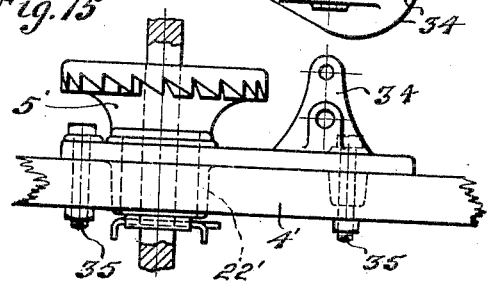

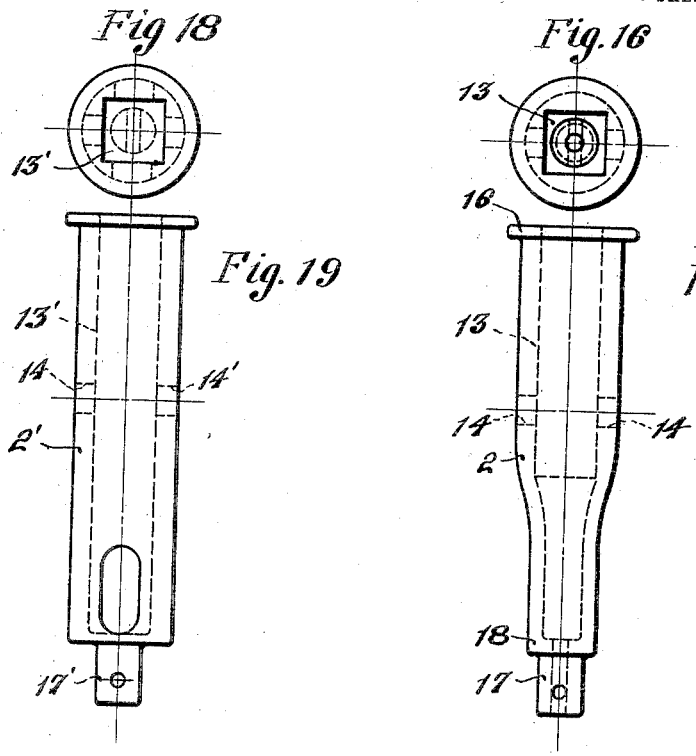
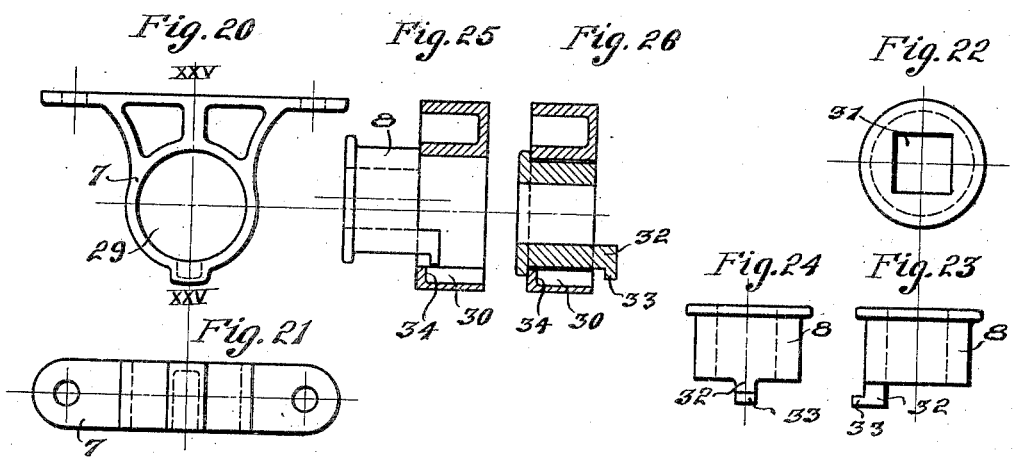

FREDERICK J. HARRISON AND WILLIAM J. KNOX, OF DUBOIS, PENNSYLVANIA.

BRAKE-SHAFT MECHANISM.

1,116,698.   Specification of Letters Patent.   Patented Nov. 10, 1914.

Application filed March 27, 1913. Serial No. 757,150.

*To all whom it may concern:*

Be it known that we, FREDERICK J. HARRISON and WILLIAM J. KNOX, both citizens of the United States, residing at Dubois, Clearfield county, Pennsylvania, have invented certain new and useful Improvements in Brake-Shaft Mechanisms, of which the following is a specification.

The invention relates to brake shaft mechanism, and has for its primary objects; the provision of an arrangement wherein the necessity of forging and machine work is substantially eliminated, thus reducing the labor cost to a minimum; the provision of a construction of simplicity and security wherein the brake rod or shaft can be removed with the greatest facility, leaving the supporting fixtures in place and held against accidental removal; the provision of an improved brake drum construction and improved means for supporting and securing the brake shaft thereto, and the provision of improved supporting means for the brake shaft above the brake drum. Certain embodiments of the invention are illustrated in preferred form in the accompanying drawings, wherein—

Figure 1 is an end elevation of a car with our improved brake shaft mechanism applied thereto, Fig. 2 is a side elevation of the mechanism shown in Fig. 1, Fig. 3 is a plan view of the brake wheel, Fig. 4 is a front elevation of a modified form of brake step, Fig. 5 is a side elevation of the construction of Fig. 4, Figs. 6, 7, and 8 are detail views of the brake step preferably employed, Fig. 6 being a plan view, Fig. 7 a front elevation, and Fig. 8 a side elevation, Figs. 9 and 10 are sections through the brake step and ratchet wheel, the two sections being taken at right angles to each other, Fig. 11 shows in detail the key employed for preventing the removal of the ratchet wheel from the brake step, Figs. 12 and 13 are side elevation and bottom plan views respectively of the ratchet wheel employed, Fig. 14 is a plan view of the plate construction employed where a wooden brake step is used, Fig. 15 is a side elevation showing the arrangement of the ratchet wheel where the plate of Fig. 14 is employed, Figs. 16 and 17 are plan and side elevation views of the brake drum, Figs. 18 and 19 are plan and side elevation views of a modified form of brake drum, Figs. 20 and 21 are plan and front elevation views respectively of the guide block or bracket employed, Figs. 22, 23, and 24 are plan, front and side elevation views respectively of the thimble employed with the block or bracket of Figs. 20 and 21, Fig. 25 is a section on the line XXV—XXV of Fig. 20, with the thimble shown in side elevation as it is being positioned in the bracket, and Fig. 26 is a similar section on the line XXV—XXV of Fig. 20, but with the thimble in operative position and in section.

Briefly stated, the apparatus comprises in its preferred embodiment as illustrated, a square brake shaft, a brake wheel carried at the upper end of the brake shaft, a brake drum at the lower end of the brake shaft supported by brackets, a brake step, a ratchet wheel carried by the brake step, and a guide or bearing support for the brake shaft above the ratchet wheel. The apparatus is so arranged in its preferred form that the brake shaft is held against vertical movement only by a single bolt carried by the brake drum, so that upon the removal of this bolt the brake shaft can be moved upward through the ratchet wheel and through the guide, at the same time leaving such parts and the drum securely held against accidental removal. The bolt hole above referred to, at the lower end of the brake shaft, and another bolt hole at the upper end for securing the handwheel in position constitute the only machine work required upon the brake shaft, such brake shaft being of ordinary wrought material as it comes from the rolls. The opening through the thimble carried by the guide, as well as the openings in the brake wheel, the ratchet wheel, and the brake drum, are angular in cross section, to correspond to that of the brake shaft, so that these parts are non-rotative with respect to the shaft, and at the same time permit the shaft to slide through them.

Referring now to the general arrangement of parts as shown in Figs. 1 and 2, the principal parts may be enumerated as follows. 1 is the brake shaft preferably square in cross section; 2 is the brake drum to which is secured the usual brake chain 3; 4 is the brake step; 5 is the ratchet wheel; 6 is the ratchet; 7 is a bearing guide or block in which is mounted a thimble or sleeve 8; 9 is the handwheel provided with a squared recess to receive the upper end of the brake shaft 1 held against removal by means of the bolt 10; and 11 and 12 are brackets for supporting the brake drum 2.

The drum construction employed will be readily understood by reference to Figs. 16 and 17 in connection with Figs. 1 and 2. The drum is provided with a squared opening or recess 13 for the reception of the brake shaft. The lower end of the brake shaft fitting into the recess 13 is provided with a transverse slot adapted to aline with the openings 14 and 14 (Fig. 17) when the brake shaft is seated in the recess 13, and a bolt 15 (Figs. 1 and 2) is passed through these openings and serves to prevent upward movement of the brake shaft with respect to the drum. This bolt 15 also serves to carry the end of the brake chain 3. The upper end of the drum 2 is provided with a collar 16 which collar is adapted to rest upon the horizontal plate of the bracket 11. The lower end of the drum 2 is also provided with a reduced portion 17 adapted to extend through a perforation in the bracket 12, the shoulder 18 thus formed serving to take a portion of the thrust of the drum. The drum is held against vertical movement with respect to the bracket 12 by means of the split ring 19 (Fig. 1) extending through the perforation in the reduced portion 17. As indicated in Fig. 17, the drum is preferably made with two diameters, the upper portion which receives the first portion of the brake chain being larger in diameter than the lower portion. This provides for the rapid winding up of the chain at the first portion of the braking operation, with a slower and more powerful braking action in the latter portion of the operation, at which time the chain is wound upon the lower portion of the drum.

As indicated in Figs. 6, 7, and 8, the brake step 4 is preferably made as a single casting, with the ratchet carrying lugs 20 integral with the plate, as are also the supporting brackets 21. The mounting and construction of the ratchet wheel and its relation to the brake shaft will be understood by reference to Figs. 9, 10, 11, 12, and 13. By reference to these figures it will be seen that the brake step 4 is provided with an integral hub or bearing portion 22, and that the ratchet wheel 5 is provided with a hub portion 23, fitting in and rotatable in the hub 22, so that the ratchet wheel constitutes a rotatable sleeve for supporting the shaft in the member 22. The opening or perforation through the ratchet wheel 5 is rectangular in cross-section so that the ratchet wheel is non-rotative with respect to the shaft 1, the shaft being freely slidable endwise through the ratchet wheel. In order to prevent the removal of the ratchet wheel from the step, either before or after the shaft 1 is in position, the key 24 provided with the square opening 25 adapted to receive the shaft 1 is employed. By reference to Fig. 12 it will be seen that the lower end of the hub 23 of the wheel is transversely slotted as indicated at 26. This slot 26 receives the key 24, and after the key has been positioned as indicated in Fig. 10 the split portion 27 is turned up, and this portion 27 in connection with the turned-up portion 28 prevents sliding movement of the key in both directions. By the foregoing arrangement the ratchet wheel 5 is securely held against accidental removal, even after the shaft 1 has been slipped from its position in the wheel.

The construction of the guide or bearing block 7 and its rotatable thimble or sleeve 8 are illustrated in detail in Figs. 20 to 26. The member 7 is provided with a circular opening 29 in which the thimble or sleeve 8 fits rotatably. At one side of the opening 29 is a slot 30 (Fig. 25), such slot terminating short of one end of the member 7. The thimble or sleeve 8 which is provided with the squared opening 31 to receive the shaft 1 is also provided with the extension or leg 32 having the laterally projecting lug 33 adapted to engage the slot 30. In assembling the parts the thimble is first placed in the position indicated in Fig. 25, with the projection 33 opposite the slot 30. The thimble is then moved laterally so that the projection 33 fits into the slot 30, and the thimble shoved endwise until it reaches the position indicated in Fig. 26. After the brake shaft has been placed in position extending through the opening 31 in the thimble it is of course impossible to remove the thimble, as the projection 33 will strike the shoulder 34 formed by the end of the slot 30 (Fig. 25). After the brake shaft has been removed the thimble is not liable to be accidentally displaced, as the chance of the projection 33 registering with the slot 30 is slight, and even with such registration an upward and then a lateral movement is necessary in order to secure the removal of the thimble.

It will be seen that the apparatus as heretofore described may be very easily assembled and that when once assembled the parts are securely held in position. The brake shaft may be removed from the car very readily, and with a minimum amount of trouble, as all that is necessary is the removal of the bolt 15, after which the shaft 1 can be shifted vertically through the ratchet wheel and bearing block 7. The bearing drum 2 is very securely supported, and the single bolt 15 is made to serve the double function of securing the brake shaft against removal and for attaching the brake chain. The various parts with which the brake shaft coöperates are made of castings, and their form is such that little machine work is necessary. The brake shaft itself requires no machine work whatever, except the provision of the two holes for the passage of the bolts 10 and 15, there being no cutting out of key-ways, forging, or shaping of any kind necessary in order to adapt the shaft for its function. Various other advantages incident to the construction will be apparent to those skilled in the art.

Figs. 4 and 5 illustrate a modified arrangement of the brake step. In this construction the step 4' is supported by brackets 21' which are separate instead of being integral with the body of the step as is the case with the preferred construction. As illustrated in Figs. 4 and 5 the step is of wood and a separate plate 34 is necessary for carrying the ratchet 6'. The construction of plate or bracket 34 is illustrated in detail in Figs. 14 and 15. The plate is secured to the step 4' by means of the bolts 35, and is provided with a downwardly projecting flange 22' corresponding in all respects to the flange 22 of the other type of construction. The ratchet wheel 5' is the same throughout as the ratchet wheel 5 in the other type of construction.

In Figs. 18 and 19 a slightly modified type of drum is shown, the drum 2' in this construction having uniform diameter throughout instead of varying in diameter as in the construction of Figs. 16 and 17. The drum is provided with the squared recess 13' for the reception of the brake shaft, and the lower end of the brake shaft is slotted to receive a securing bolt corresponding to the bolt 15 in the other type of construction, the slots 14' in the drum providing for the passage of such bolt. The lower end of the drum is reduced in diameter as indicated at 17', such reduced end having the same function as in the construction of Figs. 16 and 17. It will be understood that although a square shaft is shown and is preferably used, other types of shaft may be used, the only requirement being that such shaft be angular in cross section to slidably but non-rotatably engage the various rotating parts.

What we claim is:

1. In combination in brake shaft mechanism, a brake drum supported for rotation, a brake shaft angular in cross section with its lower end having sliding engagement with the drum but non-rotative with respect thereto, releasable means for holding the shaft against vertical movement in the drum, and a plurality of rotatable sleeves fitting the shaft slidably above the drum and held against vertical movement permitting the vertical removal of the shaft therethrough after said releasable means is disengaged from the drum.

2. In combination in brake shaft mechanism, a brake drum having a collar at its upper portion and a reduced bearing portion at its lower end, bracket means comprising a plate encircling the drum and engaging the said collar, a plate perforated to receive said bearing portion of the drum, releasable means for securing said bearing portion against upward movement with respect to the said perforated plate, a brake shaft slidably but non-rotatably fitting in the drum, a bolt extending through the drum and shaft, and a brake chain secured to the bolt.

3. In combination in brake shaft mechanism, a brake drum having a collar at its upper portion and a reduced bearing portion at its lower end, bracket means comprising a plate encircling the drum and engaging the said collar, a plate perforated to receive said bearing portion of the drum, releasable means for securing said bearing portion against upward movement with respect to the said perforated plate, a brake shaft slidably but non-rotatably fitting in the drum, a bolt extending through the drum shaft, and a brake chain secured to the bolt, the portion of the drum carrying the bolt being of larger diameter than the portion of the drum therebeneath.

4. In combination in brake shaft mechanism, a supporting plate having a circular opening therethrough, a ratchet wheel having a hub extending through the opening and provided with an angular brake shaft opening, an angular brake shaft extending through the said opening in the hub, and releasable means carried by the hub and engaging the plate for preventing the removal of the said hub from the opening through the plate.

5. In combination in brake shaft mechanism, a supporting plate having a circular opening therethrough, a ratchet wheel having a hub extending through the opening and provided with an angular brake shaft opening, an angular brake shaft extending through the said opening in the hub, and a key for preventing the removal of the said hub from the opening through the plate.

6. In combination in brake shaft mechanism, a supporting plate having a circular opening therethrough, a ratchet wheel having a hub extending through the opening and provided with an angular brake shaft opening, an angular brake shaft extending through the said opening in the hub, and a key carried by the hub and encircling the shaft for preventing the removal of the said hub from the opening through the plate.

7. In combination in brake shaft mechanism, a supporting plate having a circular opening therethrough, a ratchet wheel having a brake shaft opening angular in cross section and also having a hub fitting the opening and provided with a transverse key receiving slot, a key fitting the slot, and a brake shaft angular in cross section extending through the opening in the ratchet wheel.

8. In combination in brake shaft mechanism, a supporting plate having a circular opening therethrough, a ratchet wheel having a brake shaft opening angular in cross section and also having a hub fitting the opening and provided with a transverse key receiving slot, a key having a perforation angular in cross section and fitting the said slot, and a brake shaft extending through the opening in the ratchet wheel and the said perforation.

9. In combination in brake shaft mechanism, a supporting plate having a circular opening therethrough, a ratchet wheel having a brake shaft opening angular in cross section and also having a hub fitting the opening and provided with a transverse key receiving slot, a key having a perforation angular in cross section and fitting the said slot, and a brake shaft extending through the opening in the ratchet wheel and the said perforation, the said key having a bent up lug to prevent the accidental removal of the key.

10. In combination in brake shaft mechanism, a supporting plate having a hub with a circular opening therethrough, a ratchet wheel having a hub fitting the said opening and provided with an angular perforation, an angular brake shaft extending through the said angular perforation, and a releasable means carried by the hub and engaging the plate for preventing the upward movement of the wheel after the removal of the shaft.

11. In combination in brake shaft mechanism, a supporting plate having a hub with a circular opening therethrough, a ratchet wheel having a hub fitting the said opening and provided with an angular perforation, an angular brake shaft extending through the said angular perforation, and a key carried by the hub of the wheel and held against removal by the shaft, the said key engaging the hub of the said plate and preventing upward movement of the wheel.

12. In combination in brake shaft mechanism, a supporting plate having a hub with a circular opening therethrough, a ratchet wheel having a hub fitting the said opening and provided with an angular perforation, an angular brake shaft extending through the said angular perforation, and a key carried by the hub of the wheel and encircling the shaft, the said key engaging the hub of the said plate and preventing upward movement of the wheel.

13. In combination in brake shaft mechanism, a guide block having a circular perforation, and a slot at the side of the perforation terminating short of the end of the block, a thimble fitting the said perforation and provided with a laterally projecting lug adapted to engage the said slot, the said thimble having an angular opening therethrough, and a brake shaft angular in cross section fitting the said angular opening.

14. In combination in brake shaft mechanism, a guide block having a circular perforation, and a slot at the side of the perforation terminating short of the end of the block, a thimble fitting the said perforation and provided with an extension at one end having a laterally projecting lug adapted to engage the said slot, the said thimble having an angular opening therethrough, and a brake shaft angular in cross section fitting the said angular opening.

15. In combination, a straight square brake shaft provided at its ends with bolt holes, a drum with a squared recess receiving one end of the brake shaft, a bolt extending through the drum and the bolt hole in one end of the shaft, a handwheel having a squared recess receiving the other end of the shaft, and a bolt extending through the hub of the handwheel and the bolt hole in the other end of the brake shaft.

In testimony whereof we have hereunto signed our names in the presence of the two subscribed witnesses.

F. J. HARRISON.
WM. J. KNOX.

Witnesses:
W. I. FINCH,
O. G. McNAUGHTON.

Copies of this patent may be obtained for five cents each, by addressing the "Commissioner of Patents, Washington, D. C."